Dec. 26, 1967 R. L. JUDGE ETAL 3,360,596
METHOD OF FABRICATING A CORE SUPPORT UNIT FOR USE IN
ASSEMBLING MAGNETIC CORE MATRICES
Filed Feb. 26, 1964

INVENTORS
ROBERT L. JUDGE
JOHN J. ROBINSON

BY Robert Lieber

ATTORNEY

United States Patent Office 3,360,596
Patented Dec. 26, 1967

3,360,596
METHOD OF FABRICATING A CORE SUPPORT UNIT FOR USE IN ASSEMBLING MAGNETIC CORE MATRICES
Robert L. Judge, Poughkeepsie, and John J. Robinson, Wappingers Falls, N.Y., assignors to International Business Machines Corporation, New York, N.Y., a corporation of New York
Filed Feb. 26, 1964, Ser. No. 347,510
1 Claim. (Cl. 264—156)

ABSTRACT OF THE DISCLOSURE

A method is disclosed of forming support fixtures suitable for holding closely spaced subminiature annular magnetic cores on end with centers in planar and linear alignment. The method includes the basic step of forming the cavities in which the cores are held by a process of stamping in which allowance is not made for removal of the material displaced to form the cavities.

---

This concerns a method of fabricating support units for holding magnetic cores on edge during assembly of magnetic core matrices. Such units are used in association with vacuum forming and wire threading apparatus to securely hold the cores on edge while wires are threaded through the cores. An example of typical apparatus of this type is disclosed in U.S. Patent No. 2,958,126 to W. P. Shaw et al.

In fabricating core support units the practice has hitherto been to first form a complementary mold out of hard metal stock and then to cast the required unit or units by use of the mold. This practice has been satisfactory in the formation of units for accommodating small planar arrays of cores—e.g. 64 by 64—of moderate size—e.g. .080 inch in diameter. However, in recent years core sizes have been decreasing and packaging densities have been increasing to the point where it is often necessary to accommodate a large planar array—e.g. 64 by 1024—of miniature cores—e.g. 0.021 inch in diameter—in a small area—e.g. approximately 1000 to the square inch. Under such conditions the formation of a precision mold is quite difficult, time consuming, and inefficient; especially if only a single cast is to be made.

Accordingly, an object of this invention is to provide an improved method of fabricating core support units for use in assembling magnetic core matrices.

Another object is to provide an improved method of forming a dense matrix pattern of closely spaced cavities of precisely determined shape and size in a core support unit.

Figure 1:
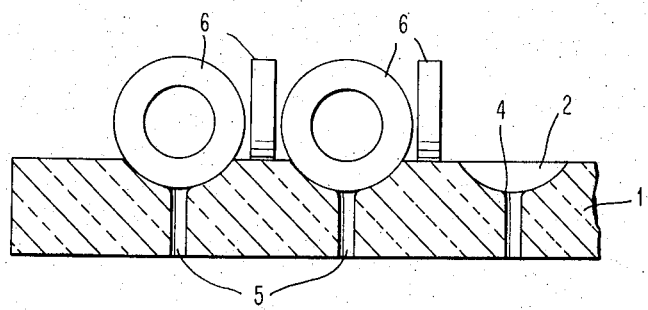
Figure 2:
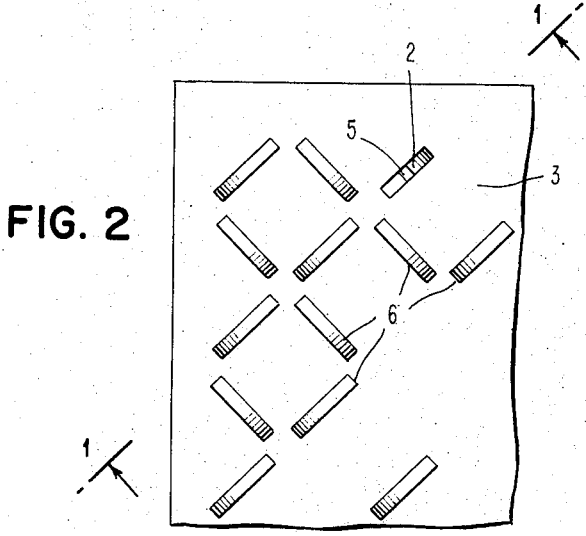
Figure 3:
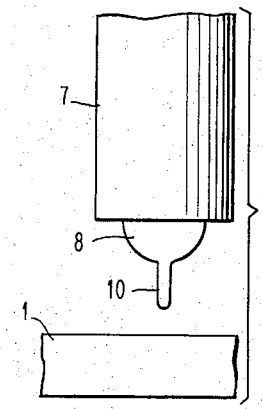
Figure 4:
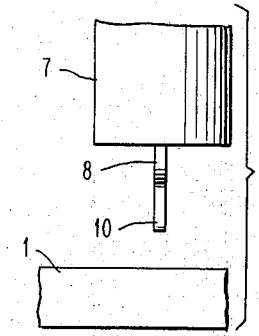
Figure 5:
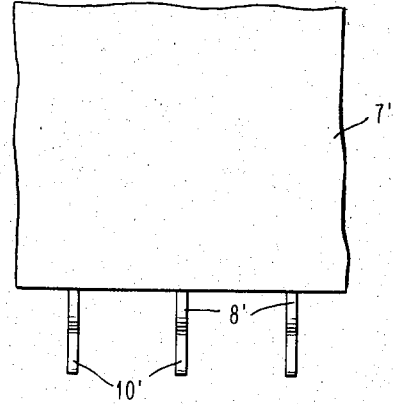

Other objects and features of the invention will best be understood and appreciated by referring to the following description and claim, and also to the accompanying drawing wherein: FIGS. 1 and 2 are respective section and plan views of a portion of a core support unit fabricated by the method of this invention, the section of FIG. 1 being taken along the line 1—1 of FIG. 2; FIGS. 3 and 4 are side elevations of a punch used in the subject method; and FIG. 5 is a side elevation of a modified punch having multiple projections for simultaneous formation of multiple core holding cavities.

Referring to FIGS. 1 and 2 a core support unit fabricated according to the method of this invention comprises generally a slab 1 of a suitable material; preferably a material in the thermoplastic or acrylic family, such as Plexiglas. The slab 1 at the conclusion of the process hereinafter described contains a dense matrix pattern of discrete cavities 2. Each cavity is designed to hold a toroidal magnetic core on edge so that the central hole in the core projects above the surface of the slab, thereby affording access for threading wires through the core. As particularly shown in FIG. 2 the holding cavities 2 are arranged in columns and rows in a rectangular matrix pattern. In the illustration, cavities are omitted at certain the matrix crosspoints—e.g. at 3—to illustrate the versatility of the present method of matrix formation. Also for illustrative purposes the cavities in alternate rows are oriented at different angles, although, in general, patterns of cavities having any angular orientation can be produced by the present method.

As indicated in FIG. 1 the cavities are shaped to complement and thereby to hold the disk-shaped cores. In a typical support unit formed by the method of this invention, cavities are required to accommodate cores having outer diameter measurements (O.D.) of .021 and .012 inch in a confined area such that the distance between the centers of adjacent cavities is .036 inch. Under these circumstances the spacing between the edges of successive row or column cavities is quite small—approximately .026, .022 and .012 inch—and therefore it would ordinarily be assumed that extreme care must be exercised to obtain cavities of identical shape. As explained below, however, the practice of the subject method does not require more than ordinary skill and care.

At the bottom 4 of each cavity there is an aperture 5 connecting the cavity with the underside of the slab 1. Thus, with a vacuum present at the underside of unit 1, cores 6 (FIG. 1), which are seated in the cavities, are securely held in place. Only two cores 6 are illustrated in the section of FIG. 1, the third cavity being shown empty to more clearly illustrate its shape.

In forming the cavities, a metal punch 7 (FIGS. 3 and 4), having at least one projection 8, the shape of which complements that of the cavity to be formed, is pressed into the blank stock of material from which the support unit is to be formed. The projection of the punch is made of a hard metal—preferably high speed steel—and the material is held in place by any suitable clamping device.

If a punch such as that shown in FIGS. 3 and 4, is used, it is advanced sequentially through all the crosspoint positions in, for example, a row of the matrix, after which the support unit stock is displaced one row position relative to the punch, and the punch is then advanced in the opposite direction through the next series of row positions. This continues until the entire matrix of cavities has been formed. Note that by means of this stamping technique it is possible to selectively omit cavities (e.g. for fabricating an experimental core support unit) as shown at 3 in FIG. 2, and it is also possible to select the angular orientations of the cavities relative to the lines defining the matrix coordinates, by selectively orienting the punch at each matrix position. Alternatively, a punch such as 7' (FIG. 1) may be used to form multiple cavities at each stamping stroke.

The holes 5 can be formed by an additional projection 10 on the punch, or the cavities 2 can be separately formed by a punch and each hole 5 can thereafter be formed by a drill positioned in the cavity.

The unusual aspect of the use of this stamping technique is that although the cavities are formed to close tolerances, the stamping operations need not be followed by an elaborate buffing, lapping, or other smoothing operation to remove deformations caused by displacement of the material stamped out of the cavities. In analogous close tolerance metal hobbing operations, in which cavities considerably larger and more widely separated than those considered herein are hobbed out of hard metal, the usual procedure is to first stamp the metal stock and thereafter to carefully file, buff, or machine the material in and around the resulting cavity structure to eliminate deformations due to displacement of the worked material. If, as was believed by those active in this field, a similar elaborate polishing procedure was required for the detailed and the close tolerance work involved in the formation of a core support unit, it would be unfeasible to contemplate the use of a punch. Certainly, if gross deformations were to occur, extreme care and an excessive amount of time would be required to buff or file the surface of the support unit while avoiding damage to the interior walls of a tiny cavity. This is the precise reason why a stamping operation had not been attempted or even considered by those actively engaged in the manufacture of core support units. And yet when we experimented with a punch to stamp a core support unit out of a slab of Plexiglas—in which the cavities were each .012 inch in length by .004 inch in width by .005 inch in depth, and in which the centers of adjacent cavities are separated by approximately .012 inch—we found that excellent results were obtained merely by punching and no further buffing, lapping, or other smoothing operations were required.

The advantages of the present method over the more conventional mold forming procedures, are summarized as follows: The present technique is readily adaptable to selective formation and orientation of cavities and to formation of additional rows and columns of cavities on a previously finished support unit. The method also adapts readily to the use of programmed automation techniques and equipment since both the positioning and the stamping operation of the punch relative to the work piece are simple repetitive operations which are easily programmed. Also, the present technique is effective in the formation of cavities of such small size that a mold casting technique would be ineffective or formation of the mold would be extremely inefficient.

The subject stamping method also adapts readily to the formation of even more complicated patterns of closely spaced ridges and cavities by a programmed manipulation of standardized punches. Thus, where but a few highly detailed parts are to be manufactured, in contrast to the mass production capability of a mold, a stamping procedure may be used to advantage.

For larger cavities heat may be applied to the punch to ease the penetration of the material. However, for small cavities (e.g. .022 inch in length by .005 inch wide by .007 inch deep) excellent results were obtained by cold-working. In some instances, it was found desirable to lightly lap the worked surface with #600 grit paper to obtain the necessary level surface for wire threading. Good cold-working results have also been obtained with semi-soft metals such as brass, copper and aluminum.

While the invention has been shown and described with particular reference to a preferred embodiment thereof, it will be understood by those skilled in the art that the foregoing and other changes in form and details may be made therein without departing from the spirit and scope of the invention.

What is claimed is:

The method of fabricating a support unit for holding a matrix of magnetic cores on edge during threading of wires through the cores comprising the steps of:

positioning a stock of acrylic plastic material from which the said unit is to be formed in predetermined relation to a punch having a shape corresponding to the shape of a miniature magnetic core element;

selecting positions on the stock so that the distance between consecutive surface positions is on the order of magnitude of the size of the core to be held in said cavity wherein the separation between adjacent cavities is approximately .012 inch at row intervals of approximately .036 inch; selectively impressing, by direct stamping action, an arcuate indentation while holding the punch at an angular orientation of 90° to the material to a close tolerance so that the plastic material is displaced into the stock sheet without removing material, said indentation conforming to the shape of an arc segment of a subminiature toroidal magnetic core approximately .021 inch in outer diameter by approximately .012 inch in lateral thickness and said surface being planar without upsets;

and simultaneously forming at each indentation a connecting opening between the indentation and the opposite surface of the said acrylic plastic material so that vacuum may be applied to the spaces within the indentation through the respective openings.

References Cited

UNITED STATES PATENTS

| | | | |
|---|---|---|---|
| 1,886,972 | 11/1932 | Payne | 264—156 |
| 2,551,094 | 5/1951 | Bryce | 264—155 X |
| 2,823,372 | 2/1958 | Jones | 340—174 |
| 2,924,863 | 2/1960 | Chavaness | 264—156 |
| 2,934,748 | 4/1960 | Steiman | 340—174 |
| 2,961,745 | 11/1960 | Smith | 29—155.5 |
| 3,038,198 | 6/1962 | Schaar | 18—1 |
| 3,098,262 | 7/1963 | Wisotzky | 264—214 |
| 3,117,368 | 1/1964 | Bartik | 29—155.56 |
| 3,284,847 | 11/1966 | Robinson | 18—1 |

FOREIGN PATENTS 297,479   3/1954   Switzerland.

OTHER REFERENCES

Plexiglas Fabricating Manual, Philadelphia, Pa., Rohm & Haas Co., 5th ed., TP1180 P5R6, 1942, pp. 3, 7, 10 to 12, 28 to 33.

Plexiglas Craftman's Handbook, Philadelphia, Pa., Rohm & Haas Co., TP1180 P5 R6p, 1953, pp. 1, 5 and 28 to 33.

Plastic Engineering Handbook, The Society of Plastic Industry Inc., 3rd ed., Reinhold Publishing Corp., New York, N.Y., 1960, pp. 629, 630, 633, 634, 635, 636, 639 and 640.

ROBERT F. WHITE, Primary Examiner.

R. R. KUCIA, Assistant Examiner.